April 29, 1930. H. S. BECKER 1,756,332
COMBINED MOTOR BEARING AND BRUSH HOLDER
Filed Feb. 18, 1928 2 Sheets-Sheet 1

Inventor
Harry S. Becker,

WITNESSES:-
Chas. L. Griesbauer
Emory D. Groff

By D. P. Wolhaupter
Attorney

April 29, 1930.  H. S. BECKER  1,756,332
COMBINED MOTOR BEARING AND BRUSH HOLDER
Filed Feb. 18, 1928   2 Sheets-Sheet 2
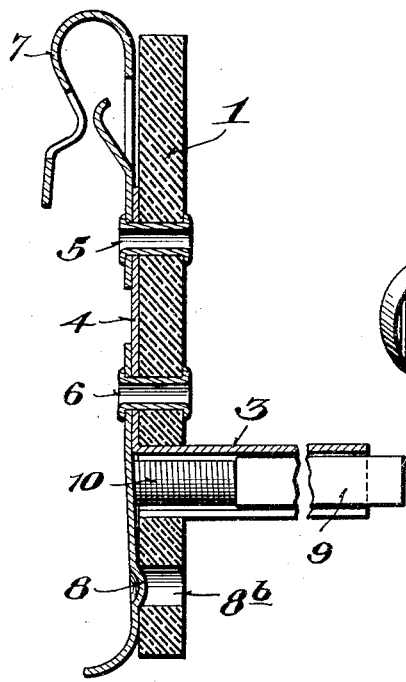
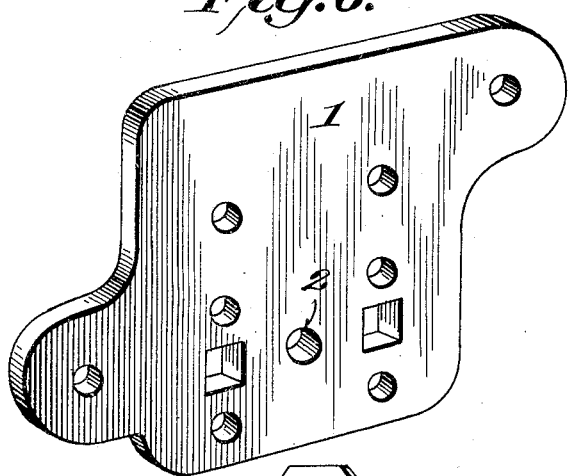
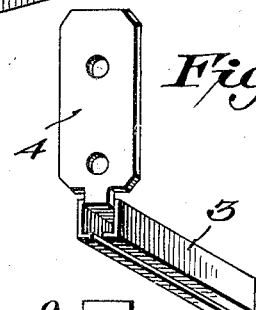
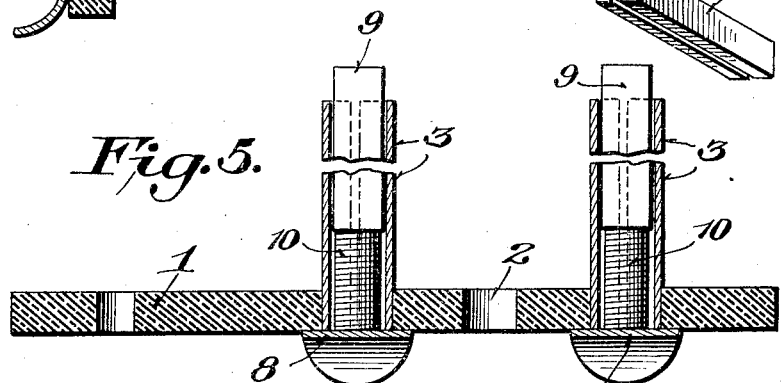
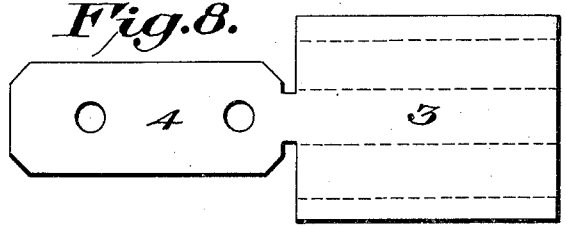
Inventor
Harry S. Becker,
By
Attorney
Witnesses:

Patented Apr. 29, 1930

1,756,332

UNITED STATES PATENT OFFICE

HARRY S. BECKER, OF RIVER FOREST, ILLINOIS, ASSIGNOR TO AMERICAN FLYER MFG. CO., OF CHICAGO, ILLINOIS, A CORPORATION OF ILLINOIS

COMBINED MOTOR BEARING AND BRUSH HOLDER

Application filed February 18, 1928. Serial No. 255,458.

This invention relates to a novel improvement in electric motors of the type generally used on toy locomotives and the like.

A primary object is to provide a brush assembly, which may be handled as a unit, and is also adapted to constitute one of the bearings for the armature shaft of the motor while at the same time carrying the brushes in such a way that they may be readily removed and replaced when desired in a convenient and expeditious manner. It is also proposed to make the body of the unit of insulating material which may be impregnated with oil or other lubricant, thereby providing a self-lubricating bearing for the armature shaft of the motor without impairing the electrical conductivity of the brush holders and associated parts. Thus the invention aims to provide a construction which obviates the necessity of oiling the armature shaft at one of its most vital points.

Another object of the invention is to provide a novel brush holder construction which is not only strong and substantial, but easy to assemble and economical to manufacture. In that connection it is proposed to provide a brush unit assembly comprising relatively few parts and which permits of connecting the line wires of the motor circuit to the brush holders without the aid of solder or other methods which have proved to be a hindrance to production in manufacturing.

A further object of the invention is to provide a brush holder construction which permits ready renewability of the armature brushes from an easily accessible position at one side of the motor frame.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which Figure 1 is a side elevation of a motor unit having the present novel bearing and brush holder mounted thereon.

Figure 4 is an enlarged vertical sectional view taken on the line 4—4 of Fig. 2.

Figure 5 is an enlarged horizontal sectional view taken on the line 5—5 of Fig. 2.

Figure 6 is a detail perspective view of the fibre body plate without fittings.

Figure 7 is a detail perspective view of one of the brush holders dismounted from the fibre body or carrier plate.

Figure 8 is a detail plan view of the blank from which the brush holder is formed.

Similar reference characters designate corresponding parts throughout the several figures of the drawings.

In carrying the invention into effect, it is proposed to utilize the same in connection with a standard type of motor unit generally used in connection with toy locomotives and which comprises a metallic frame F mounted on the wheels W, the latter being driven by the electric motor designated generally as M and including the armature shaft S and commutator C.

Figure 1:
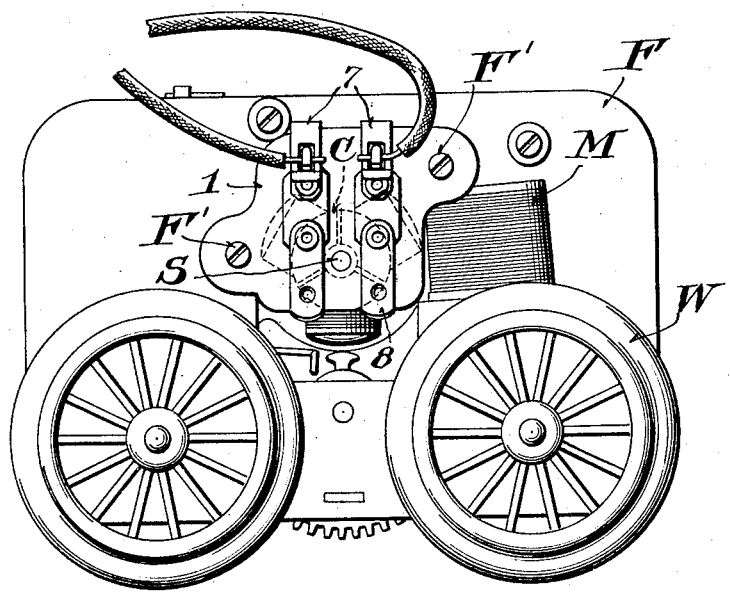
Figure 2:
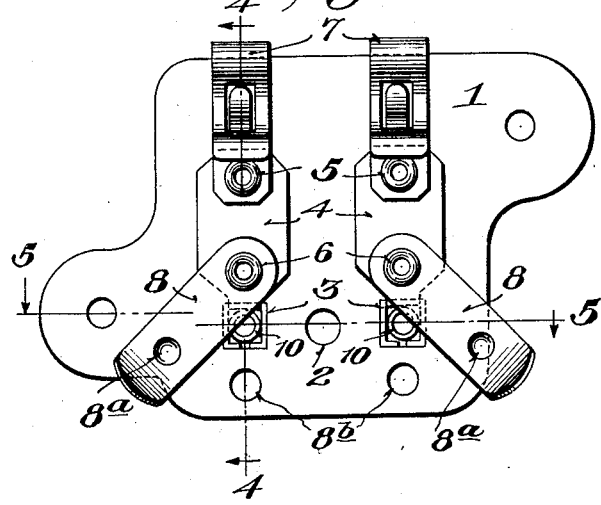
Figure 2 is an enlarged detail elevation of the combined shaft bearing and brush holding unit.
Figure 3:
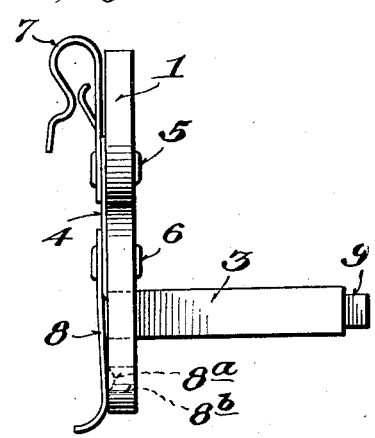
Figure 3 is a side elevation of the construction shown in Figure 2.

As will be observed from Figs. 1 and 2, the present combined motor bearing and brush carrier is preferably made in the form of a unit which may be completely assembled and fitted to the motor frame F by suitable fastenings F'. The body of the unit is formed by a carrier plate 1 which is preferably made of non-metallic material such as hard insulating fibre or the like, and is formed with an opening 2 for receiving the armature S of the motor. As previously indicated, the insulating carrier or base 1 may be coated or impregnated with oil or other lubricant either in its entirety or in the zone of the opening 2 thereby to provide a substantially self-lubricating bearing for the armature shaft of the motor.

At each side of the opening 2, the insulating base or carrier plate is provided with openings for receiving the tubular commutator brush holders 3, which in the embodiment shown are preferably of rectangular cross-section and are formed at one end with an offset attaching portion 4. The said offset attaching portions 4 are located at the outer or exposed face of the plate 1 and are secured to the latter by the fastenings 5 and 6 which in turn serve to connect the line wire terminal clips 7 and the flat spring retaining abutments 8 to the body or carrier plate. The line wire terminal clips 7 are adapted to receive and grip the line wires of the motor circuit, thereby avoiding the use of solder at this point, and the spring retaining abutments 8 are adapted to be pivotally mounted on the fastenings 6 so that they may be swung into and out of obstructing relation to the accessible ends of the tubular brush holders 3. For the purpose of holding the spring retaining abutments 8 in position to close the accessible ends of the tubular holders, the body of said abutments may be provided with an offset nib 8$^a$ adapted to enter the keeper opening 8$^b$ of the fibre body plate 1.

The tubular brush holders 3 are adapted to receive the metallic commutator brushes 9 whose inner ends are adapted to bear against the commutator C of the motor while their outer ends are adapted to be engaged by the coil springs 10 which are confined between the outer ends of the brushes and the spring retaining abutments 8. Thus, with this arrangement, the brushes 9 are continuously urged into engagement with the commutator C, thereby providing a full and clean contact with the commutator C which has the effect of minimizing or cutting down the voltage load and overcomes the necessity for cleaning the segments.

Heretofore, one of the weakest points of construction of the entire motor has been the brush contacts, the wearing action resulting on both the commutator and the brush causing a marked slowing down on the speed of the motor, and thereby requiring increased voltage to operate the motor. That is to say, due to wear between the brushes and the commutator and the weakening of the spring mounting of brushes a firm contact between the brush and the commutator has been prevented, but with the present construction providing a relatively long commutator brush and an efficient spring for persistently following up pressure on the brush, a good electrical contact will always be assured between the brush and the commutator.

From the foregoing it is thought that the essential features and advantage of the present construction will be readily understood, but it may be also pointed out that a distinctive feature of the present invention resides in the spring pressed brush construction just referred to, and the means 8 in the form of a flat pivoted retaining spring which makes it quick and easy to reach the commutator brush when desired or required. Also by providing a square brush, that is, a brush square in cross-section, the rotation thereof under contact with the commutator is prevented and even wear may be obtained by manually turning the brush around by taking it out of the holder and replacing it with a new side exposed to contact with the commutator surface.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In an electric motor, a brush carrier comprising a non-metallic member, and an integral wire terminal blank and brush holder including a flat portion adapted to be attached to the carrier and a laterally offset tubular brush holding portion, a brush therein, and wire terminal engaging means connected to said flat portion and a clip pivotally mounted on said carrier adapted to engage the end of said brush holder to retain said brush therein.

2. In an electric motor, a brush carrier comprising a non-metallic member, and a brush carrying assembly including a tubular brush holder and an integral laterally offset part adapted to be attached to said carrier, a wire terminal and a resilient locking member connected to said offset part, said member being pivotally connected thereto and adapted to be swung into and out of obstructing relation to the open end of the tubular brush holder adjacent the offset part and locking means carried by said member for holding the same in normal locked position.

3. In an electric motor, a brush carrier comprising a non-metallic member, a brush holder secured to said carrier and extending at an angle thereto, a brush slidably mounted in said holder, a resilient brush retaining clip pivotally mounted on said carrier and adapted normally to extend over the end of the brush holder to retain the brush therein, and locking means on said pivoted clip for holding the same in normal locked position.

4. In an electric motor, a brush carrier comprising a non-metallic member, a brush holder secured to said carrier and extending at an angle thereto, a brush slidably mounted in said holder, a resilient brush retaining clip pivotally mounted on said carrier and adapted normally to extend over the end of the brush holder to retain the brush therein, and locking means on said pivoted clip adapted to seat in a recess formed in said carrier to hold the clip in normal locked position.

5. In combination with a brush holder and a carrier therefor, a resilient brush retaining member pivoted to the carrier for swinging movement across the end of said brush holder, and interengageable formations on said carrier and said brush retaining member to hold the latter disposed across the end of said brush holder.

6. In combination with a brush holder and a carrier member therefor, and a resilient brush retaining member pivoted to the carrier member for swinging movement across the end of said brush holder, one of said members being provided with a recess and the other with a protuberance adapted to snap into said recess to retain said resilient member disposed across the end of said brush holder.

In testimony whereof I hereunto affix my signature.

HARRY S. BECKER.